UNITED STATES PATENT OFFICE.

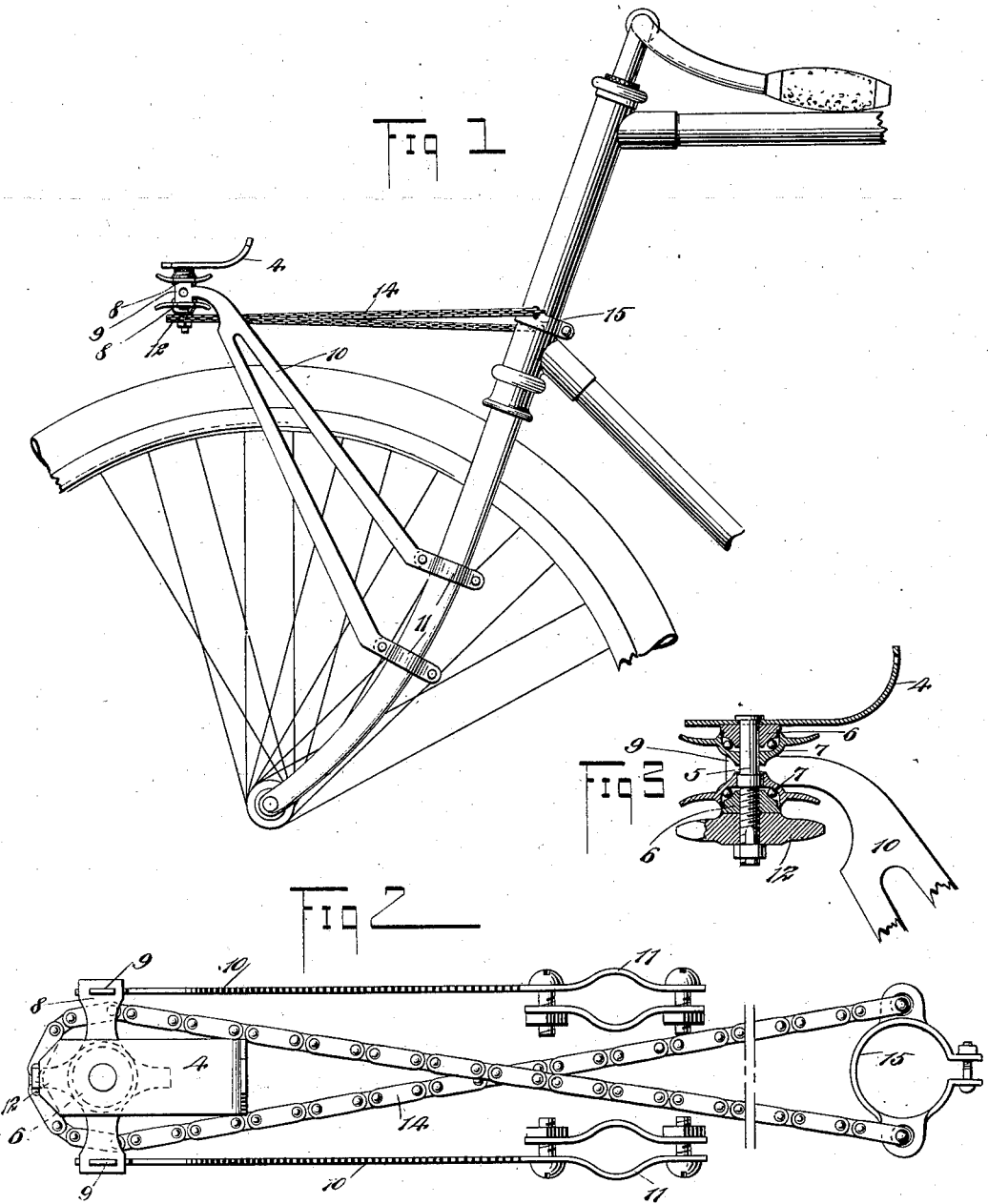

EUGENE E. HENRY, OF STAMPS, ARKANSAS.

BICYCLE-LAMP HOLDER.

SPECIFICATION forming part of Letters Patent No. 654,978, dated July 31, 1900.

Application filed November 3, 1899. Serial No. 735,694. (No model.)

*To all whom it may concern:*

Be it known that I, EUGENE E. HENRY, a citizen of the United States, and a resident of Stamps, in the county of Lafayette and State of Arkansas, have invented a new and Improved Bicycle-Lamp Holder, of which the following is a full, clear, and exact description.

The purpose of this invention is to provide a means for holding a bicycle-lamp, by which means the lamp will be instantly slued to one side when the turning of the bicycle is started by the first movement of the steering-fork.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a side elevation of the invention in use. Fig. 2 is a plan view thereof, and Fig. 3 is a detail section showing the means for mounting the bracket in which the lamp is carried.

The device is provided with a bracket 4, of any suitable form, to which the lamp is to be fastened. This bracket is fixed (see Fig. 3) to a spindle 5, which is provided with cones 6, working in cups 7, the cups 7 being respectively formed on transversely-disposed bars 8 and antifriction-balls being carried in the cups to revolubly mount the spindle 5. The transverse bars 8 are located one above the other, as best shown in Fig. 1, and are connected rigidly with each other by means of the extensions 9 of the two split arms 10. The extensions 9 are located between the transverse bars 8 and form braces for rigidly holding them in a certain relative position. By these means the bracket 4 is mounted, so that it may be turned readily from side to side, thus throwing the rays of light in the same way. The split arms 10 are located, respectively, on opposite sides of the front wheel of the bicycle, so as to carry the bracket 4 in the position indicated in the drawings. The arms 10 extend downwardly and rearwardly and are provided with clips 11, facilitating their attachment to the arms of the steering-fork.

A sprocket-wheel 12 is fastened rigidly to the lower end of the spindle 5, which spindle projects below the lower ball-cone 6, as shown in Fig. 3. A sprocket-chain 14 is passed over this wheel 12 and extends rearwardly to the steering-head of the bicycle. A clip 15 is fastened to the steering-head and provided with an eye at each side, to which eyes the respective runs of the chain 14 are connected, the runs of the chain 14 being crossed, as illustrated in Fig. 2. Now it is clear that the arms 10, being rigidly supported on the steering-fork, and the ends of the chain 14 being held to the stationary head of the bicycle, when the fork is slued to turn the bicycle in one direction or the other the arms 10 will be slued also; but the chain 14, being fast to the steering-head, which does not move, causes the spindle 5 to be turned relatively to the steering-head much faster than the movement of the steering-fork, and this spindle turns the lamp so that it points to one side before the turning of the bicycle is finished. This points the light in the direction in which the bicyclist is turning during the turning operation and not after the turn is finished, as would be the case were the lamp mounted directly on the steering-fork. By properly disposing the chain 14 and the sprocket 12 the excessive turning of the lamp may be avoided. By crossing the chain 14, as illustrated, the bracket 4 is caused to move in the same direction as that in which the bicycle is turned.

Having thus described my invention, I claim as new and desire to secure by Letters Patent—

1. In a bicycle-lamp holder, the combination of an arm adapted to be connected with the bicycle-fork, a bracket mounted to turn on the arm, and a connection extending from the bracket to a stationary part of the bicycle-frame.

2. The combination with a bicycle, of an arm attached rigidly to the steering-fork, a bracket supported to turn on the arm, and a connection between the bracket and the steering-head of the bicycle.

3. The combination of an arm, a bearing attached thereto, a spindle mounted in the bearing, a bracket attached to and turning with the spindle, a sprocket-wheel attached to the spindle, and a chain passing over the sprocket-wheel.

4. In a bicycle-lamp holder, the combination of a bracket, means for mounting the bracket on the steering-fork, the bracket being independently revoluble, and a connection extending between the bracket and the steering-head of the bicycle.

5. The combination of a lamp-holder, means by which the lamp-holder is mounted to turn, such means supporting the lamp-holder on the bicycle-fork, and a connection extending between the lamp-holder and a stationary part of the bicycle-frame.

6. The combination of two supporting-arms having extensions at their ends, bars secured to the extensions and having ball-cups formed therein, a spindle extended through the ball-cups, cones attached to the spindle and working in the ball-cups, a bracket attached to the spindle and serving to carry the lamp, a sprocket attached to the spindle, and a chain engaged with the sprocket and adapted to be connected with the steering-head of the bicycle.

7. The combination of a lamp-holder, means on which it is mounted to turn, and a chain comprising two crossed runs engaging with the lamp-holder at opposite sides of the pivot thereof, the said means for carrying the lamp-holder and the chain being respectively adapted to be fastened to relatively-mobile parts of a vehicle.

EUGENE E. HENRY.

Witnesses:
JNO. H. POLLITT,
W. H. FAUCETTE.